US012645290B2

(12) United States Patent　　　　　(10) Patent No.:　US 12,645,290 B2
Megalingam et al.　　　　　　　　　　(45) Date of Patent:　　Jun. 2, 2026

(54) EYE SIGN LANGUAGE COMMUNICATION SYSTEM

(71) Applicant: AMRITA VISHWA VIDYAPEETHAM, Kollam (IN)

(72) Inventors: Rajesh Kannan Megalingam, Kollam (IN); Sakthiprasad Kuttankulangara Monoharan, Porkulam (IN)

(73) Assignee: AMRITA VISHWA VIDYAPEETHAM, Kollam (IN)

( * ) Notice: Subject to any disclaimer, the term of this patent is extended or adjusted under 35 U.S.C. 154(b) by 198 days.

(21) Appl. No.: 18/435,125

(22) Filed: Feb. 7, 2024

(65) Prior Publication Data

US 2024/0264666 A1　　Aug. 8, 2024

(51) Int. Cl.
　　*G06F 3/01*　　　　(2006.01)
　　*G06F 3/16*　　　　(2006.01)
(52) U.S. Cl.
　　CPC ............... *G06F 3/013* (2013.01); *G06F 3/16* (2013.01)
(58) Field of Classification Search
　　None
　　See application file for complete search history.

(56) References Cited

U.S. PATENT DOCUMENTS

| | | | | |
|---|---|---|---|---|
| 10,255,483 | B2 * | 4/2019 | Hushchyn | G06V 40/165 |
| 11,709,919 | B2 * | 7/2023 | Kim | G06F 21/31 |
| | | | | 382/117 |
| 12,341,770 | B2 * | 6/2025 | Li | H04L 63/0838 |
| 2019/0246036 | A1 * | 8/2019 | Wu | G06F 3/0484 |
| 2020/0027460 | A1 * | 1/2020 | Seo | G10L 15/1815 |
| 2020/0380264 | A1 * | 12/2020 | Poteet | G06V 20/49 |
| 2021/0201021 | A1 * | 7/2021 | Novelli | G06F 3/013 |
| 2021/0312193 | A1 * | 10/2021 | Alpert | B60W 40/08 |
| 2022/0044821 | A1 * | 2/2022 | Eichler | G16H 50/20 |
| 2022/0206571 | A1 * | 6/2022 | Drozdov | G06V 40/161 |
| 2022/0326771 | A1 * | 10/2022 | Pearce | A61B 5/7267 |
| 2023/0166743 | A1 * | 6/2023 | Heck | G06N 3/044 |

* cited by examiner

*Primary Examiner* — Toan H Vu
(74) *Attorney, Agent, or Firm* — WCF IP

(57) ABSTRACT

An Eye Sign language communication system and method is useful for people suffering from Quadriplegia, stroke or paralysis. The Eye Sign language communication system is based on advanced machine learning and deep learning to identify the eye sign language based on the eye blinks and direction of eye gaze with help of pupil for interpretation of signs into alphabets and words and conversion of words into speech. Hardware with sensors, controllers, and speakers along with a display screen are used to process the eye signs and display the alphabets, words and sentences and announce the detected alphabets, words and sounds using the speakers.

5 Claims, 2 Drawing Sheets

EYE SIGN LANGUAGE COMMUNICATION SYSTEM

FIELD OF THE INVENTION

The present invention relates to an Eye Sign language communication system for people suffering from Quadriplegia, stroke or paralysis.

More particularly, the present invention relates to an Eye Sign language communication system based on advanced machine learning and deep learning to identify the eye sign language based on the eye blinks and direction of eye gaze with help of pupil for interpretation of signs into alphabets and words and conversion of words into speech.

BACKGROUND OF THE INVENTION

Paralysis causes not only physical disability but also the misery of being unable to express one's thoughts and feelings. Many people lose their power of speech due to stroke, of neck injury resulting in paralysis from neck to feet etc. with severe paralysis. Quadriplegia is a type of paralysis where all the muscles stop functioning. Such people lose their mobility along with communication ability completely and become bedridden. They undergo various physiological problems and family members too suffer great emotional and physical hardships to care a loved one who is paralysed.

Researchers have long tried to find a solution to this issue using a variety of methods, including identifying the patient's gaze on a screen with letters and symbols and gathering the patient's message directly from the brain using a brain-computer interface.

Reference is made to "Development of a Sign Language for Total Paralysis and Interpretation using Deep Learning" (IEEE International Conference on Image Processing and Robotics, ICIPROB, 2020) describes a sign language that does not need a system with monitors to express words but an assisting chart that the patient and others can use to understand each other using Convolutional Neural Network (CNN) to classify the movements of the pupil and the blinking of the eye an eye and a tracking system to build a better interface with the patient which will translate the patient's signs and also alarm in times of emergency.

Another reference is made to "Eye-blink detection system for human-computer interaction" (Universal Access in the Information Society, 2012) discloses a vision-based human—computer interface which detects voluntary eye-blinks and interprets them as control commands. The employed image processing methods include Haar-like features for automatic face detection, and template matching based eye tracking and eye-blink detection. The interface is based on a notebook equipped with a typical web camera and requires no extra light sources.

Another reference is made to "A gaze-based interaction system for people with cerebral palsy" (Conference on Enterprise Information Systems/HCIST 2012—International Conference on Health and Social Care Information Systems and Technologies) disclosing an augmentative system for people with movement disabilities to communicate with the people that surround them, through a human-computer interaction mechanism based on gaze tracking in order to select symbols in communication boards, which represent words or ideas, so that they could easily create phrases for the patient's daily needs.

However, these strategies turned out to be expensive, less effective and requires extremely precise pupil centre computation, making it difficult to achieve higher precision and accuracy.

Augmentative and Alternative Communication (AAC) is a boon to people with speech or language problems. AAC supports any mode of communication other than speech for these people. It can be hand gesture based, eye gesture based, using facial expression, eye blinks, tongue, head, Brain Control Interface (BCI) etc. But all of these modes of communication are not useful for all users. Particularly users who have problems due to apahsia caused by stroke, head injury or brain tumour, amyotrophic lateral sclerosis (ALS), cerebral palsy, locked-in syndrome or other motor impairments cannot use tongue or head or hand etc. for communication.

For users with ALS and other motor impairments eye gesture, eye gaze, eye blinks etc. can be used for communication. There are three types of AAC including low technology based, high technology based and non-technical.

Writing, drawing, spell words by pointing the alphabets, gestures, pointing to images, drawings, words etc. are some of the low technologies based or non-technical AAC. High technology based AAC include using app on smartphone or any other electronic gadget like tablets to communicate and using voice enabled computer to recognize gestures etc.

The existing systems and devices for AAC for people with ALS and other motor impairments have several limitations including the speed, cost, interpreters, mobility etc.

There are various eye tracking related inventions in the exiting state of art which can track eyeballs for gaming, rehabilitation, or other applications, however, no such system is available to track eyeballs for communicating a language like English. The present invention provides an easy to use economic and highly accurate Eye Sign language communication system based on advanced machine learning and deep learning.

SUMMARY

An object of the present invention is to provide an Eye Sign language communication system capable of helping the people incapable of normal speech to communicate in a coherent manner.

Another object of the present invention is to provide an Eye Sign language communication system based on advanced machine learning.

Yet another object of the present invention is to provide an Eye Sign language system capable of identifying the Region of Interest (ROI) by using machine learning.

Yet another object of the present invention is to provide an Eye sign language communication system capable of capturing eye gestures and eye blinks to create words and sentences.

Yet another object of the present invention is to provide an Eye sign language communication system capable of detecting eye blinks and direction of eye gaze with the help of pupil to interpret signs for alphabets, words and speech.

The present invention is directed to an Eye Sign language communication system capable of helping the people incapable of normal speech to communicate in a coherent manner, particularly, the people suffering from Quadriplegia, stroke or paralysis.

The present invention relates to an Eye Sign language communication system (101) based on Netravaad, an interactive communication system for people with speech disability to use their eyes to create signs and speak through eyes which is fast, cost effective and does not need interpreters.

The user can communicate with eye signs in two modes: quickly communicate with the caretaker or relative via commonly used words or with written words and sentences, character by character. Predictive text feature is implemented to reduce the effort of the users in creating signs for all characters in a word and while forming sentences. The sign language created using eye signs in Netravaad is called Netravaani. Using Sarani algorithm, the eye signs captured by a low-cost Input device including USB camera are converted into words and/or sentences.

The Present invention relates to Netravaad and Netravaani, an interactive communication system (101) for users with speech issues and speaking natural language using eyes. The main contribution of present invention is as follows:

Design and development of Netravaani, collection of unique eye signs for Natural Language alphabets and words (English).

Design and development of Sarani, an algorithm to detect the alphabets and words using eye signs.

Design and development of the device for eye sign detection for users with ALS and other motor impairments Evaluation of Netravaani, Sarani and Netravaad via various tests with 10 volunteers The Eye Sign language communication system (101) consists of several blocks. The architecture of the present invention consists of the following blocks:

Data acquisition

Face detection

Application of Landmarks

Eye detection

Eye sign detection

Text/number detection

Text/Number to speech conversion

The system starts with the data acquisition block wherein a camera (103) is used to capture the face data (FD) of the User (U) using the system. The said face data (FD) is used by face detection algorithms to detect the face (F).

Next block of the present system is the detection of landmark points in the face (F). The said landmark points help in extracting the coordinates of the eye (E). Machine Learning and Deep Learning algorithms are used for identifying the Region of Interest (ROI). The Landmark points help in the process of identifying the ROI.

The next block of the present system is Eye detection. Once the eye (E) is detected from the face, segmentation filter is applied to find the direction of eye gaze using the pupil. Depending on the direction of eye gaze with help of pupil, signs for alphabets and words are interpreted. A Segmentation filter helps in detecting eye blinks which can also play a significant role in communicating. Finally, the interpreted words are converted into speech.

A prerequisite for proper working of the proposed system is to provide training for the quadriplegics, stroke affected patients etc. who lost their ability to speak or communicate with others.

Eye Sign:

Eye sign language has five categories of eye signs i.e., left, right, top, close and center. Eye signs are identified using 3 types of ratios i.e., blinking ratio, vertical ratio, and horizontal ratio.

Blinking ratio determines whether the eye is closed. Vertical ratio determines the position of the pupil is top i.e., the extreme top is approx. 0.0. Horizontal ratio determines the position of the pupil is left, right or center i.e., it returns a number between 0.0 and 1.0 that indicates the horizontal direction of the pupil. The extreme right is approx. 0.0, the center is approx. 0.5 and the extreme left is approx. 1.0.

Calibration:

An initial calibration is added before the eye sign tracking. Calibration includes a module for adjusting brightness of the input feed. The brightness control is pop up GUI in which the user can adjust the brightness value.

A face position mark was the user had to place the face within marking. By positioning the face, it maintains a constant distance between the camera and the user and a straight line of sight with camera and eyes. After setting the brightness and face position the user is required to press the spacebar for confirmation.

GUI for Brightness Control:

In GUI of the present invention, the user can increase or decrease the brightness value using the + button and − button respectively. If the user closes the GUI window the default value is set for the brightness. After pressing the ok button, the face positioning calibration starts.

The Alphabet a to z is Obtained by Using a Combination of Eye Sign Pattern as in the Table Below:

| | |
|---|---|
| A | - ↑ → - |
| B | - → ↓ - |
| C | - ↓ ← - |
| D | - ← ↑ - |
| E | - ↑ ← - |
| F | - ← ↓ - |
| G | - ↓ → - |
| H | - → ↑ - |
| I | - ↑ ↓ - |
| J | - ↑ ↓ ← - |
| K | - ↑ → ↓ - |
| L | - → ↓ ← - |
| M | - ↓ ← ↑ - |
| N | - ← ↑ → - |
| O | - ↑ ← ↓ - |
| P | - ← ↓ → - |
| Q | - ↓ → ↑ - |
| R | - → ↑ ← - |
| S | - ↑ → ↓ ← - |
| T | - → ↓ ← ↑ - |
| U | - ↓ ← ↑ → - |
| V | - ← ↑ → ↓ - |
| W | - ↑ ← ↓ → - |
| X | - ← ↓ → ↑ - |
| Y | - ↓ → ↑ ← - |
| Z | - → ↑ ← ↓ - |

Other Patterns Used in the Module:

| | |
|---|---|
| Yes | - ↑ - |
| No | - ↓ - |
| Lock | - ↑ ↓ - |

Lock can only work in first iteration to lock the detection. The lock can be revoked by following the same pattern again.

- represents looking center

↓ represents eye closes

↑ represents looking top

→ represents looking right

← represents looking left

By following the above patterns, the user can obtain the desired alphabet and also they can clear the alphabet if they had made a mistake in the eye sign by following [-, ↓, -]—(no).

After the user chooses the desired alphabet, they can choose predefined words starting with the alphabet by following the particular pattern [-, ↑, -]—(yes) to start prediction. If the user wants to change the predicted word follow the pattern [-, ↓, -]—(no) to show the next word in the list.

The user can continue with the above pattern to change the suggestion word until the suggestions get over. For choosing the suggested word user should follow the pattern [-, ↑, -]—(yes).

There are Two Special Case Letter i.e., N and S:

Case 1:

After selecting N there are 2 condition 'words with letter N' and 'numeric mode'. On selecting 'words with letter N' using [-, ↑, -]—(yes) pattern it gives suggestion of word with N.

Case 2:

After selecting S there are 2 condition 'words with letter S' and 'sentence mode'. On selecting 'words with letter S' using [-, ↑, -]—(yes) pattern it gives suggestion of word with S.

Sentence Formation Using Eye Sign Language

Sentence formation module is present in letter S. After selecting S there are 2 condition 'words with letter S' and 'sentence mode'. Using the pattern [-, ↓, -]—(no) to change 'words with letter S' to 'sentence mode'.

On selecting the sentence mode using [-, ↑, -]—(center, top, center) pattern the user can use the same pattern of a-z to obtain the desired sentence. To confirm the letter use pattern [-, ↑, -] (yes), [-, ↓, -]—(no) to clear and to add space use pattern [-, →, ←-] pattern. To confirm the sentence use pattern [-, ↓, ↑, -] and it start the iteration from the beginning.

Other Patterns Used in this Module:

| | |
|---|---|
| Yes | - ↑ - |
| No | - ↓ - |
| Space | - → ← - |
| Confirmation | - ↓ ↑ - |

Numeric Formation Using Eye Sign Language

Numeric formation module is present in letter N. After selecting N there are 2 condition 'words with letter N' and 'numeric mode'. Using the pattern [-, ↓, -]—(no) to change 'words with letter N' and 'numeric mode'.

On selecting 'numeric mode' it open a new iteration where we can use the same pattern in the table to obtain 0-9. To confirm the number use pattern [-, ↑, -] (yes) and [-, ↓, -]—(no) to clear the number. To confirm the numeric value use pattern [-, ↓, ↑, -] and it start the iteration from the beginning.

| | |
|---|---|
| 0 | - ↑ → - |
| 1 | - → ↓ - |
| 2 | - ↓ ← - |
| 3 | - ← ↑ - |
| 4 | - ↑ ← - |
| 5 | - ← ↓ - |
| 6 | - ↓ → - |
| 7 | - → ↑ - |
| 8 | - ↑ ↓ - |
| 9 | - ↑ ↓ ← - |

Other Patterns Used in the Module:

| | |
|---|---|
| Yes | - ↑ - |
| No | - ↓ - |
| Confirmation | - ↓ ↑ - |

DETAILED DESCRIPTION

Figure 1:
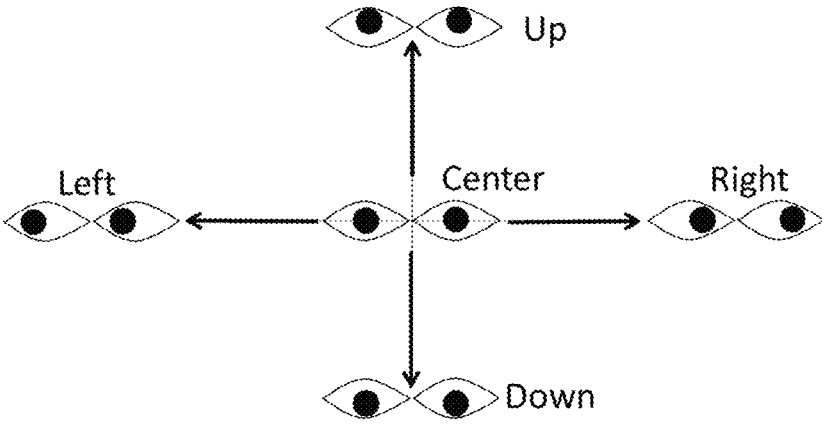
FIG. 1 depicts the five basic eye signs as used in the invention.

The Eye Sign language communication system (101), Netravaad of present invention comprises of I/O module comprising of at least one touch display (102), at least one camera (103), at least one speaker (104), at least one server including PC (105), at one power source including but not limited to 24V Battery (106).

All these modules are mounted on a portable and adjustable stand (107), which allows flexibility in setting the camera and display at any height and orientation as per the user's requirement. A unique sign language called Netravaani is defined using five simple, basic eye signs as shown in the FIG. 1 and their combinations. These basic eye signs include center, left, right, up and down. The corresponding symbols are provided in the Table 1. By using various combinations of eye signs the user can create all the English alphabets, words, sentences and numbers. Each combination of eye signs starts and ends with 'center' eye sign so that the user remembers it easily. For example, if the user wants to create the alphabet 'a' then the corresponding eye sign pattern is: center→up→right→center. This can be encoded as [- ↑ → -]" pattern as shown in the Table 2.

The eye sign patterns for all the 26 alphabets and ten numbers are shown in the Table 2. The eye signs are captured by the camera (103) and decoded and interpreted into characters, words and/or sentences by using the Sarani algorithm installed in the server including PC (105). The speaker (104) is used for the voice output corresponding to the characters, words and sentences. A simple GUI that is developed and installed in the PC (105) gets launched when the system is powered. FIG. 1 shows the five basic eye signs as used in the invention.

TABLE 1

| Different symbols for different eye signs | |
|---|---|
| Symbol | Eye sign |
| - | Looking Center |
| ↓ | Looking Down/Close |
| ↑ | Looking Up |
| → | Looking Right |
| ← | Looking left |

TABLE 2

Alphabets and numbers and their corresponding patterns
formed by various combination of basic eye signs.

| Alphabet | Pattern | Alphabet | Pattern | Alphabet | Pattern | Number | Pattern |
|----------|---------|----------|---------|----------|---------|--------|---------|
| A | -↑→- | K | -↑→↓- | U | -↓←↑→- | 0 | -↑→- |
| B | -→↓- | L | -→↓←- | V | -←↑→↓- | 1 | -→↓- |
| C | -↓←- | M | -↓←↑- | W | -↑←↓→- | 2 | -↓←- |
| D | -←↑- | N | -←↑→- | X | -←↓→↑- | 3 | -←↑- |
| E | -↑←- | O | -↑←↓- | Y | -↓→↑←- | 4 | -↑←- |
| F | -←↓- | P | -←↓→- | Z | -→↑←↓- | 5 | -←↓- |
| G | -↓→- | Q | -↓→↑- | | | 6 | -↓→- |
| H | -→↑- | R | -→↑←- | | | 7 | -→↑- |
| I | -↑↓- | S | -↑→↓←- | | | 8 | -↑↓- |
| J | -↑↓←- | T | -→↓←↑- | | | 9 | -↑↓←- |

GUI and Calibration Process

Figure 2:
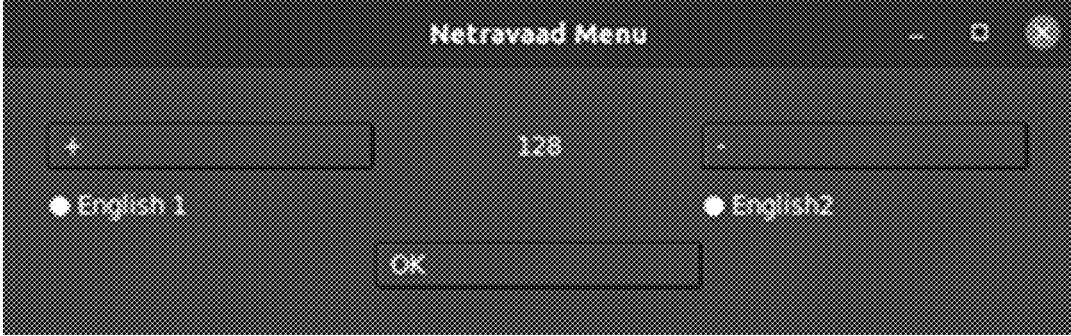
FIG. 2 depicts GUI for Netravaad.

After the powerup, a simple GUI opens up on the touch display of Netravaad. The GUI template is shown in FIG. 2. It has options to choose the English 1 and English 2 modes and adjust the brightness. English 1 is the default mode in this system. It is to choose a word from a set of predefined word via eye signs. English 2 is for formation of any word or sentence using eye signs. Using the '+' and '−' buttons on GUI the brightness can be adjusted. 128 is the default brightness value. The OK button is used to confirm the selections in the GUI. If the user selects the OK button without adjusting the brightness or selecting a mode, then the default values are taken.

Figure 3:
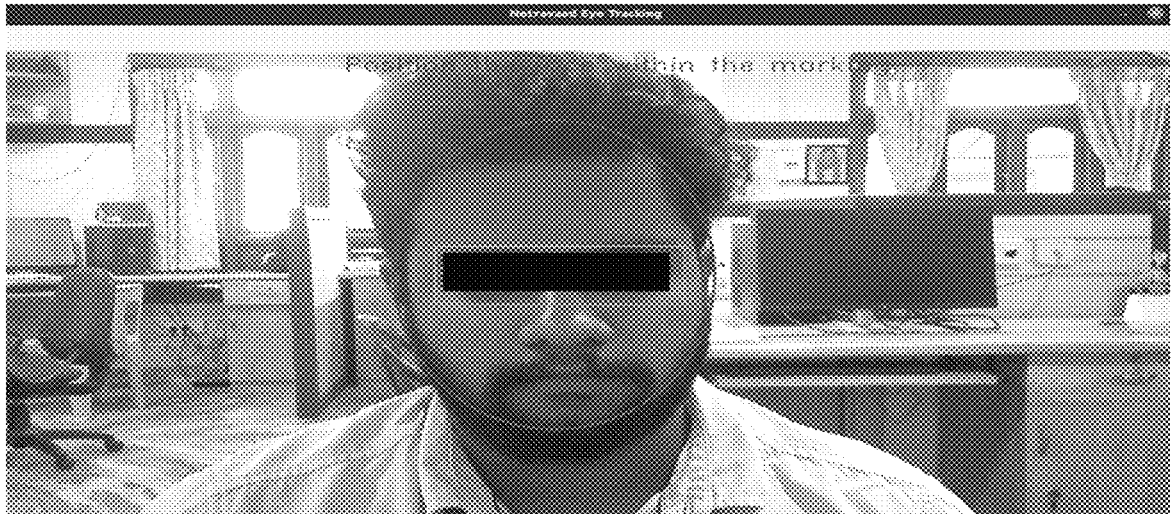
FIG. 3 depicts the user's position of face for calibration of eye sign pattern detection

An initial calibration procedure should be completed before the eye sign tracking. When the system is powered up and connected to Wi Fi network, the GUI guides the calibration process. Calibration includes a feature for adjusting the brightness of the camera input feed and a feature for fixing the head position of the user. The calibration is for the positioning of the face. The device is adjusted in such a way that the user's face is positioned within the red marking as shown in FIG. 3. During the calibration process, a green rectangle bounding box appears around the user's eye as the eye detection algorithm starts detecting the eyes. The green rectangle bounding box must be within red mark. This step maintains a constant distance between the camera and the user's face and have a straight line of sight with the camera and the user's eyes. To confirm the calibration process, the caregiver can touch on the display. Then a chart of the eye signs corresponding to the selected mode appears on the display. FIG. 3 shows the user's position of face for calibration of eye sign pattern detection Netravaaani Eye Sign Language Modes of Operation The user can select between two modes: English 1 and English 2. English 1 is for quick communication with the caretakers, physicians or relatives in which a set of ten predefined, commonly used words can be selected. This mode is also considered as a familiarization mode, useful in getting started with the training of the user before starting with English 2 mode. For leisure communication the user can start the English 2 mode which has four sub-modes: Alphabet mode, Word mode, Sentence mode and Number mode. Each of the sub-modes can be chosen by the user with specific eye signs.

English 1 Mode

After selecting English 1 mode, a chart of the eye signs and its corresponding word pops up on the display as in Table 3, so that the user can refer to the chart for eye signs pattern. The user can create the pattern corresponding to the desired word in the list. Once the word is selected, it appears on the screen along with voice for the word. The user confirms the chosen word using the eye sign pattern for 'YES' after which another voice confirmation is issued via speaker and the word selection is completed. For example, if the user chose the word "SIT" and confirmed it, then the voice confirmation is, "YOU HAVE CHOSEN THE WORD SIT". If 'SIT' is not the word, the user can say 'NO' using eye sign pattern during the voice confirmation and start fresh. Table ?? shows the eye sign patterns and their corresponding predefined words. The pseudo code for the English one mode is also provided below the Table 4.

TABLE 3

Different patterns for different words

| Pattern | Predefined words |
|---------|------------------|
| - ↑ - | YES |
| - ↓ - | NO |
| - ← - | SIT |
| - → - | LAY DOWN |
| - ↑ ↓ - | FOOD |
| - ↓ ↑ - | SLEEP |
| - ← → - | MEDICINE |
| - → ← - | PAIN |
| - ↑ → - | WASHROOM |
| - ↑ ← - | WATER |

TABLE 4

Pseudo code - English 1

```
START
WHILE TRUE:
    IF Eye Sign Pattern = Predefined Words THEN
    Display(Predefined Word)
    ELSE IF Eye Sign Pattern = Mode Change THEN
    Display("Switching to alphabet mode")
    BREAK
END WHILE
STOP
```

English 2 Mode

Alphabet and Word Formation

This mode is to use patterns for alphabets to create words or sentences. When English 2 mode is selected, a chart of the eye sign patterns and its corresponding alphabet pops up on the display as in Table 2, so that the user can refer to the chart for eye signs pattern if needed. Once an alphabet is displayed the user can give two more inputs 'YES and 'LOCK'. 'YES' can be used to begin the word prediction starting with the chosen alphabet. The pattern of 'LOCK' can be used to suspend the process for some time. The process can be resumed by giving the same pattern again. 'LOCK' is helpful when the user wants to suspend the Netravaad communication for a brief period and resume later. Table 5 shows the eye sign pattern for YES, NO and LOCK words. The pseudo code for the shared part which is common for word formation, number formation and sentence formation sub-modes using eye sign patterns is shown in Table 6.

TABLE 5

Patterns for the formation of words

| Pattern | Input |
|---|---|
| - ↑ - | YES |
| - ↓ - | NO |
| - ↑ ↓ - | LOCK |

TABLE 6

Shared pseudo code

```
START
Menu:
Mode selection
WHILE TRUE:
IF Eye Sign Pattern != "S' and 'N' THEN
IF Eye Sign Pattern != Mode Change THEN
    GOTO AWP
    IF Eye Sign Pattern = Mode Change THEN
    Display("switching to main menu)
    BREAK
    GOTO Menu
    ELSE
    Display(alphabet)
ELSE
GOTO Sentence / Number
END WHILE
STOP
Pseudo code for Alphabet and Word Prediction (AWP)
AWP:
IF Eye Sign Pattern = YES THEN
    Word suggestion(Alphabet):
    IF Eye Sign Pattern = YES THEN
    Display(Word)
    ELSE
    INCREMENT: word suggestion index
    GOTO Word suggestion
ELSE
    Alphabet is cleared
```

Sentence Formation

Sentence formation mode is selected using the alphabet 'S'. When eye sign pattern for 'S' is performed, the input can be either 'words starting with alphabet S' or the 'Sentence mode'. The pattern 'NO' [-, ↓, -] can be used select the 'Sentence mode'. After selecting the sentence mode, the user can use the same pattern of a-z as in Table 2 to obtain the desired words and create a sentence. Various other eye sign patterns used in sentence formation is shown in Table 8. The user can use the pattern for 'YES' to confirm the alphabet, which is displayed on a separate window. Due to mistake in the pattern if the chosen alphabet is wrong, the pattern 'NO' is used to clear the alphabet. Multiple correct alphabets are concatenated to create words. The pattern for 'SPACE' can be used to add space between words. Instead of creating sentences alphabet by alphabet, the user can choose a sentence from the list of prestored sentences. The Netravaad system is designed in such a way that it gives an option to the user to predict one of the three probable sentences at a time. To select one of the first three sentences from the list, the user can use the patterns [- ← -], [- ↑ -] and [- → -] corresponding to first, second or the third sentence respectively. The user chooses the pattern 'NO' to choose from the next three sentences in the list. If no more sentences are available in the list, it changes to manual mode where the user should perform different patterns for each character. To confirm the sentence, the user can input the pattern for 'CONFIRM' after which the system provides voice output by reading the sentence the user created. To resume the process, the user needs to give 'RESUME' input. After giving 'CONFIRM' and it starts a new iteration. To switch to the alphabet formation page user, need to give 'HOME input'. The pseudo code for sentence formation is shown in Table 8.

TABLE 7

Patterns for the formation of sentence

| Pattern | Input |
|---|---|
| - ↑ - | YES |
| - ↓ - | NO |
| - → ← - | SPACE |
| - ← - | FIRST |
| - ↑ - | SECOND |
| - → - | THIRD |
| - ↓ ↑ - | CONFIRM |
| - ↓ - | RESUME |
| - ← → - | HOME |

TABLE 8

Pseudo code for sentence

```
Sentence:
IF Eye Sign Pattern != 'S' THEN
GOTO AWP / Number
ELSE
Display(Word Starting with S)
IF Eye Sign Pattern = YES THEN
GOTO Word suggestion (S)
ELSE
Display(Sentence mode)
IF Eye Sign Pattern = YES THEN
    Sentence Mode:
    IF Eye Sign Pattern = Confirm THEN
    Display(Obtained Sentence)
    ELSE IF Eye Sign Pattern = Space THEN
        IF Sentence Prediction available THEN
        Select Sentence from prediction and GOTO Sentence Mode
        ELSE
        Append Space and GOTO Sentence Mode
    ELSE IF Eye Sign Pattern = Switch THEN
    Display(Switching to Alphabet mode) and GOTO AWP
    ELSE
        Display(Alphabet)
        IF Eye Sign Pattern = YES THEN
        Alphabet is appended and GOTO Sentence Mode
        IF Eye Sign Pattern = NO THEN
        Alphabet is cleared and GOTO Sentence Mode
ELSE
GOTO AWP
```

Number Formation

Number formation mode is selected using the alphabet N. The eye sign patterns for numbers are shown in Table 2. When the user creates eye sign pattern for the alphabet N, there are two possibilities. The selection can be either words starting with alphabet N or switching to the number mode. The pattern 'NO' [-, ↓, -], can be used to select the number mode. Once the number mode is selected the Table 2 can be used to input the numbers zero to nine. After each number is created, the user can use 3 different patterns 'YES', 'NO', and 'CONFIRM' as per Table 7 to accept or reject the number. The pattern 'YES' [-, ↑, -], indicates that the number is correct and the pattern 'NO' [-, ↓, -] indicates that it is a wrong number. In addition, the pattern 'NO' clears the number. If the number is correct it is displayed on a separate window. Every time the user choses a correct number, it is concatenated to the previous number. After choosing the required digits, the user can use pattern 'CONFIRM' [-, ↓, ↑, -] to confirm the digits as valid. Once the 'CONFIRM' pattern is selected the system provides voice output by reading the number (all digits) and starts a new iteration. To switch to the alphabet formation page, the user needs to create the pattern 'HOME. The pseudo code for the number formation is shown in Table. 9.

TABLE 9

| Pseudo code for number |
| --- |
| Number: |
| IF Eye Sign Pattern != 'N' THEN |
| GOTO AWP/ sentence |
| ELSE |
| Display(Word Starting with N) |
| IF Eye Sign Pattern == YES THEN |
| GOTO Word suggestion (N) |
| ELSE |
| Display(Number mode) |
| IF Eye Sign Pattern == YES THEN |
| Number Mode: |
| IF Eye Sign Pattern != Confirm THEN |
| Display(Number) |
| IF Eye Sign Pattern == YES THEN |
| Number is selected and GOTO Number Mode |
| ELSE |
| Number is cleared and GOTO Number Mode |
| ELSE |
| GOTO AWP |

Evaluation

A comparison of the performance of Netravaad with similar methods using eyes as mode of communication was performed, available in the literature.

TABLE 10

| Comparison of Netravaani with other methods | | |
| --- | --- | --- |
| S. no. | Method | Communication |
| 1 | Eyeblink-based wearable device by Tarek et al. [1] | Modified Morse code chart |
| 2 | Eyeblink-based device with IR LED camera and PC by Kowalczyk et al. [2] | Blinking and winking-based eye gestures |
| 3 | Gesture recognition based on the mobile app by Vaitukaitis et al. [3] | Eye gesture-based recognition of 4 eye gaze patterns |
| 4 | Smartphone with GazeSpeak app by Zhang et al. [4] | Eye gaze based selection of alphabets from a GUI |
| 5 | Eye Type method which used a webcam, display and a PC by R. Rahnama et al. [5] | Eye gesture-based selection of alphabets from tile groups |
| 6 | A microcontroller-based wireless symbol chart and wireless speaker module by G. Hornero et al. [6] | Touch input on a symbol chart |
| 7 | The present invention Netravaad system with camera, display, PC and speaker | Eye gesture-based Netravaani language and Sarani algorithm |

Table 10 shows the comparison of Netravaani with other methods. When a comparison was performed of Netravaani with all other systems, there is no existing system that defines a unique eye gaze pattern for the formation of all alphabets in a language. The GUI in the display will show the alphabet patterns using which the user can make unlimited number of words, sentences, etc.

Evaluation of Sarani

A test was conducted for the detection of alphabets based on the Sarani algorithm. Ten volunteers with 3 females and 7 males participated in the test. For each volunteer, we conducted 10 trials using the same hardware. Recall, precision, and accuracy in detecting the correct alphabet was obtained using the test. The average recall, precision, and accuracy values were 89%, 71% and 66% respectively.

TABLE 11

| Recall, precision, and accuracy in detecting the correct alphabet | | | | | |
| --- | --- | --- | --- | --- | --- |
| S. no | Distance from the camera | Volunteer | Recall | Precision | Accuracy |
| 1 | 70 cm | M | 0.962264 | 0.87931 | 0.85 |
| 2 | 70 cm | F | 0.828571 | 0.537037 | 0.483333 |
| 3 | 70 cm | M | 0.9 | 1 | 0.9 |
| 4 | 70 cm | M | 1 | 0.733333 | 0.733333 |
| 5 | 70 cm | F | 0.884615 | 0.851851 | 0.766666 |
| 6 | 70 cm | F | 0.861111 | 0.563636 | 0.516666 |
| 7 | 70 cm | M | 0.65 | 0.577777 | 0.440677 |
| 8 | 70 cm | M | 1 | 0.733333 | 0.733333 |
| 9 | 70 cm | M | 0.928571 | 0.68421 | 0.65 |
| 10 | 70 cm | M | 0.897435 | 0.625 | 0.590163 |

A second test was conducted to evaluate Sarani. The test was to find recall, precision, and accuracy in detecting the correct word. Ten volunteers with 3 females and 7 males participated in the test. For each volunteer, we conducted 10 trials using the same hardware. The average recall, precision, and accuracy values were 98%, 96% and 95% respectively.

TABLE 12

| Recall, precision, and accuracy in detecting the correct alphabet | | | | | |
| --- | --- | --- | --- | --- | --- |
| S. no | Distance from the camera | Volunteer | Recall | Precision | Accuracy |
| 1 | 70 cm | F | 1 | 1 | 1 |
| 2 | 70 cm | M | 1 | 1 | 1 |
| 3 | 70 cm | M | 1 | 1 | 1 |
| 4 | 70 cm | M | 0.907949 | 0.911764 | 0.834615 |
| 5 | 70 cm | M | 1 | 1 | 1 |
| 6 | 70 cm | M | 1 | 1 | 1 |
| 7 | 70 cm | F | 1 | 0.8947368 | 0.894736 |
| 8 | 70 cm | M | 1 | 1 | 1 |
| 9 | 70 cm | M | 0.962264 | 0.87931 | 0.85 |
| 10 | 70 cm | F | 1 | 1 | 1 |

Evaluation of the Netravaad System

To evaluate the Netravaad system tests were conducted with another set of volunteers. The first test was conducted for ten different volunteers where their head was placed at 3 different distances from the camera. The distances we selected were 60 cm, 70 cm and 80 cm. This test was to find recall, precision, and accuracy in detecting the correct alphabet. Ten volunteers, 3 females and 7 males participated in the test. For each volunteer, we conducted 10 trials using the same hardware. At 60 cm away from the camera, the recall, precision, and accuracy were 77%, 80%, and 65% respectively. At 70 cm away from the camera, the recall, precision, and accuracy were 89%, 80%, and 73% respectively. At 80 cm away from the camera, the recall, precision, and accuracy were 75%, 71%, and 58% respectively.

TABLE 13

Recall, precision, and accuracy in detecting the correct alphabet, where the volunteer at 60 cm away from the camera

| S. no | Distance from the camera | Volunteer | Recall | Precision | Accuracy |
|---|---|---|---|---|---|
| 1 | 60 cm | M | 0.866666 | 1 | 0.866666 |
| 2 | 60 cm | M | 0.795918 | 0.847826 | 0.716666 |
| 3 | 60 cm | F | 0.946428 | 0.929824 | 0.883333 |
| 4 | 60 cm | M | 0.745454 | 0.891304 | 0.683333 |
| 5 | 60 cm | M | 0.782908 | 0.72 | 0.6 |
| 6 | 60 cm | M | 0.65 | 0.577777 | 0.440677 |
| 7 | 60 cm | M | 0.385964 | 0.88 | 0.36666 |
| 8 | 60 cm | F | 1 | 0.733333 | 0.733333 |
| 9 | 60 cm | F | 0.760736 | 0.593301 | 0.523076 |
| 10 | 60 cm | M | 0.788461 | 0.911111 | 0.75 |

TABLE 14

Recall, precision, and accuracy in detecting the correct alphabet, where the volunteer at 70 cm away from the camera

| S. no | Distance from the camera | Volunteer | Recall | Precision | Accuracy |
|---|---|---|---|---|---|
| 1 | 70 cm | M | 0.962264 | 0.87931 | 0.85 |
| 2 | 70 cm | M | 0.884615 | 0.851851 | 0.766666 |
| 3 | 70 cm | F | 0.9 | 1 | 0.9 |
| 4 | 70 cm | M | 1 | 0.733333 | 0.733333 |
| 5 | 70 cm | M | 0.928571 | 0.68421 | 0.65 |
| 6 | 70 cm | M | 0.861111 | 0.563636 | 0.516666 |
| 7 | 70 cm | M | 0.897435 | 0.625 | 0.590163 |
| 8 | 70 cm | F | 0.839285 | 0.921568 | 0.783333 |
| 9 | 70 cm | F | 0.807692 | 0.913043 | 0.766666 |
| 10 | 70 cm | M | 0.907949 | 0.911764 | 0.834615 |

TABLE 15

Recall, precision, and accuracy in detecting the correct alphabet, where the volunteer at 60 cm away from the camera

| S. no | Distance from the camera | Volunteer | Recall | Precision | Accuracy |
|---|---|---|---|---|---|
| 1 | 80 cm | M | 0.652173 | 0.90909 | 0.62 |
| 2 | 80 cm | M | 0.625 | 0.714285 | 0.5 |
| 3 | 80 cm | F | 0.896551 | 0.962962 | 0.8666 |
| 4 | 80 cm | M | 0.290322 | 1 | 0.56 |
| 5 | 80 cm | M | 0.771428 | 0.51923 | 0.45 |
| 6 | 80 cm | M | 0.714285 | 0.456621 | 0.388461 |
| 7 | 80 cm | M | 0.828571 | 0.537037 | 0.48333 |
| 8 | 80 cm | F | 0.928571 | 0.68421 | 0.65 |
| 9 | 80 cm | F | 0.861111 | 0.563636 | 0.516666 |
| 10 | 80 cm | M | 0.978723 | 0.779661 | 0.76666 |

One more test was conducted to evaluate the Netravaad system. The test was conducted for nine different volunteers belonging to three different age groups. For each volunteer, 10 trials was conducted using the same hardware. The first age group was people aged from 15 to 25 years, the second group was aged from 26 to 35 years and the third group was aged from 36 to 45 years. Recall, precision, and accuracy of group one was 84%, 78%, and 70% respectively. Recall, precision, and accuracy of group two was 92%, 78, % and 91% respectively. Recall, precision, and accuracy of group three was 83%, 93%, and 79% respectively.

TABLE 16

Recall, precision, and accuracy in detecting the correct alphabet, for the different age groups

| S. no | Volunteer | Age group | Recall | Precision | Accuracy |
|---|---|---|---|---|---|
| 1 | M | Group1(15-25) | 0.907949 | 0.911764 | 0.834615 |
| 2 | M | Group1(15-25) | 0.962264 | 0.87931 | 0.85 |
| 3 | F | Group1(15-25) | 0.65 | 0.577777 | 0.440677 |
| 4 | M | Group2(26-35) | 0.866666 | 1 | 0.86666 |
| 5 | M | Group2(26-35) | 0.98305 | 0.98305 | 0.966666 |
| 6 | M | Group2(26-35) | 0.927272 | 0.980769 | 0.916666 |
| 7 | M | Group3(36-45) | 0.851851 | 0.884615 | 0.766666 |
| 8 | F | Group3(36-45) | 0.839285 | 1 | 0.85 |
| 9 | F | Group3(36-45) | 0.807692 | 0.913043 | 0.766666 |

Few Other Non-Limiting Examples:

Alphabet Detection Using Eye Sign Language:

After selecting the required MODE, a chart of the eye signs and its corresponding alphabet will be displayed on the screen, so that the user can easily start the prediction. The ALPHABET "a to z" is obtained by using a combination of eye sign pattern.

For Example:

If the user want to select the Alphabet "a", then he has to follow the patter displayed like in steps 1, 2, 3 and 4 ie. (①) '-' ②'↑' ③ '→' ④ '-'

The Alphabet "a" would be displayed.

Alphabet Detection Test:

For Checking eye signs are detecting correctly for Multiple persons using a single hardware but with different Cameras.

Criteria: Head Fixed Position

| Parameters to be measured | True positive, True negative, false, distance from camera |
|---|---|
| Parameters calculated from the measured parameters | Recall, precision, Accuracy |
| No. of repetitions | 5 times |
| Expected output | True positive 100% |
| Remarks | All the eye signs, Open CV method |

| SI. No | Condition | User | Number of trials | Distance from camera (cm) | True positive | True negative | False Positive |
|---|---|---|---|---|---|---|---|
| | | | | Logitech camera | | | |
| 1 | Head resting at a particular position, Logitech camera | Gurusharan | 5 | 30 | 22 | 0 | 0 |

-continued

| | | | | | | | |
|---|---|---|---|---|---|---|---|
| 2 | Head resting at a particular position, Logitech camera | Gurusharan | 5 | 30 | 23 | 0 | 0 |
| 3 | Head resting at a particular position, Logitech camera | Anoop | 10 | 30 | 217 | 0 | 21 |
| 4 | Head resting at a particular position, Logitech camera | Maneesha | 5 | 30 | 20 | 0 | 0 |
| 5 | Head resting at a particular position, Logitech camera | Maneesha | 5 | 30 | 19 | 0 | 0 |
| By using Laptop camera Manual repeat count | | | | | | | |
| 1 | Head resting at a particular position, laptop camera | Abhishek | 10 | 30 | 55 | 0 | 0 |
| By using Intel RealSense camera Manual repeat count | | | | | | | |
| 1 | Head resting at a particular position, Intel RealSense | Anagha | 10 | 30 | 59 | 0 | 1 |
| By using Logitech camera Automatic repeat count sensing | | | | | | | |
| 1 | Head resting at a particular position, Logitech camera | Shilpa | 10 | 30 | 58 | 0 | 0 |
| By using Laptop camera Automatic Repeat count sensing | | | | | | | |
| 1 | Head resting at a particular position, laptop camera | Adithya | 10 | 30 | 60 | 0 | 0 |
| By using Intel RealSense camera Automatic Repeat count sensing | | | | | | | |
| 1 | Head resting at a particular position, Intel RealSense | Adithyan | 10 | 30 | 60 | 0 | 0 |

| Sl. No | False Negative | Recall | Precision | Accuracy % | Remark | Inference |
|---|---|---|---|---|---|---|
| | | | | Logitech camera | | |
| 1 | 3 | 1 | 1 | 88 | Only 5 alphabets - Total 25 | Repeat count is 10 and the detection is only happening when the head is in the same position without any shake or other movements. |

-continued

| | | | | | | |
|---|---|---|---|---|---|---|
| 2 | 2 | 1 | 1 | 92 | Only 5 alphabets - Total 25 | Repeat-count is 15 the detection is almost perfectly happening because the head stood still and completed the 25 trials in one stretch |
| 3 | 22 | 1 | 0.9 | 83 | All 26 alphabets - Total 260 | Most detected distance. |
| 4 | 5 | 1 | 1 | 80 | Only 5 alphabets - Total 25 | As the Repeat count increases the delay need increases so it will increase the efficiency if we do it very slowly otherwise it won't detect the alphabet. |
| 5 | 6 | 1 | 1 | 76 | Only 5 alphabets - Total 25 | Repeat count was 15 detection precision increased slightly but the perfection doesn't meet |
| | | | | By using Laptop camera Manual repeat count | | |
| 1 | 5 | 1 | 1 | 92 | Only 6 alphabets ('a', 'c', 'j', 'k', ','y', 'z')- Total 60 | eye and alphabets are detecting accurately as compared to the other people. |
| | | | | By using Intel RealSense camera Manual repeat count | | |
| 1 | 0 | 1 | 1 | 98 | Only 6 alphabets ('a', 'c', 'j', 'k', ','y', 'z')- Total 60 | only one alphabet detected wrongly |
| | | | | By using Logitech camera Automatic repeat count sensing | | |
| 1 | 2 | 1 | 1 | 97 | Only 6 alphabets ('a', 'c', 'j', 'k', ','y', 'z')- Total 60 | The repeat count automatically selected is 15 and the camera senses the eye very well |
| | | | | By using Laptop camera Automatic Repeat count sensing | | |
| 1 | 0 | 1 | 1 | 100 | Only 6 alphabets ('a', 'c', 'j', 'k', ','y', 'z')- Total 60 | Repeat count is 15, Alphabet detected perfectly |
| | | | | By using Intel RealSense camera Automatic Repeat count sensing | | |
| 1 | 0 | 1 | 1 | 100 | Only 6 alphabets ('a', 'c', 'j', 'k', ','y', 'z')- Total 60 | Repeat count is 15 and everything detected perfectly |

Conclusion:

In the ALPHABET DETECTION TEST, the accuracy in detecting the alphabets was checked, using eye sign as per the NETRAVAANI—the algorithm used in the present invention to convert eye sign into alphabets, into words and even into sentences. Here, the test was conducted using different cameras and all the tests are performed at a distance of 30 cm from the camera. A maximum accuracy of 100% and minimum accuracy of 76% [this is only from one subject] was observed. In all the remaining cases, an accuracy above 80% was received. The intel real sense camera is giving better performance that other two cameras that been used.

Word Prediction Using Eye Sign Language:

After selecting the required MODE, a chart of the eye signs and its corresponding alphabet will display on the screen, so that the user can easily start the prediction. User (U) chooses the desired alphabet and they can choose predefined words starting with the alphabet by following the particular pattern For Example:

Select the alphabet "a". The WORDS WITH LETTER 'a' displays on the screen. Like "Accept" "Apple" "Agree"

The user can confirm H by using the pattern [-, ↓, ↑, -]. (center, top, center)

The chosen word would be displayed. Like if the user confirms the word "Accept" then it will be displayed.

Word Detection Test for Checking eye signs are detecting correctly for Multiple persons using a single hardware.

Criteria: Head Fixed Position

| Parameters to be measured | True positive, True negative, false, distance from camera |
|---|---|
| Parameters calculated from the measured parameters | Recall, precision, Accuracy |
| No. of repetitions | 5 times |
| Expected output | True positive 100% |
| Remarks | All the eye signs, Open CV method |

Conclusion:

In the WORD DETECTION TEST, the accuracy of predicting the words was checked using eye sign with the help of NETRAVAANI. In this instance, the camera distance was set at 70 cm, the test was run, and a 100% accuracy was received with all the subjects.

Sentence Formation Using Eye Sign Language

Sentence formation module is present in the alphabetic letter 'S'. On selecting the sentence mode using [-, ↑, -] means (center, top, center) pattern the user can use the same pattern of a-z to obtain the desired sentence. After the User chooses the desired alphabet; predefined words starting with the alphabet will be displayed. By clubbing Different words a sentence can be made.

For Example:

For forming the word "om nama shivaya" first the uses goes to the alphabet 'o' and confirms the word 'OM' then he moves on to the next required alphabet 'N' then confirms the word 'NAMA' and then 'SHIVAYA'. So the display Sentence as "om nama shivaya".

The same way the user can form different sentences.

Sentence Detection Test:

For checking eye signs are detecting correctly for Single persons using a single hardware and a single camera.

Criteria: Head Fixed Position

| Parameters to be measured | True positive, True negative, false, distance from camera |
|---|---|
| Parameters calculated from the measured parameters | Recall, precision, Accuracy |
| No. of repetitions | 5 times |
| Expected output | True positive 100% |
| Remarks | All the eye signs, Open CV method |

| SI. No | Condition | User | Number of trials | Distance from camera (cm) | True positive | True negative | False Positive | False Negative | Recall | Precision | Accuracy % | Remark | Inference |
|---|---|---|---|---|---|---|---|---|---|---|---|---|---|
| 1 | Head is not resting at particular position | Gokul Riju | 1 | 70 | 10 | 0 | 0 | 0 | 1 | 1 | 100 | 10 words (2 words each for alphabets a, c, j, k, y) - Total 10 | All are true positive. |
| 2 | Head is not resting at particular position | Sreekanth | 1 | 70 | 10 | 0 | 0 | 0 | 1 | 1 | 100 | 10 words (2 words each for alphabets a, c, j, k, y) - Total 10 | All are true positive. |
| 3 | Head is not resting at particular position | Vishnu | 1 | 70 | 10 | 0 | 0 | 0 | 1 | 1 | 100 | 10 words (2 words each for alphabets a, c, j, k, y) - Total 10 | All are true positive. |
| 4 | Head is not resting at particular position | Arjun | 1 | 70 | 10 | 0 | 0 | 0 | 1 | 1 | 100 | 10 words (2 words each for alphabets a, c, j, k, y) - Total 10 | All are true positive. |
| 5 | Head is not resting at particular position | Anagha | 1 | 70 | 10 | 0 | 0 | 0 | 1 | 1 | 100 | 10 words (2 words each for alphabets a, c, j, k, y) - Total 10 | All are true positive. |

| Sl. No | Condition | User | Number of trials | Distance from camera (Range) (cm) | Sentence | Number of Alphabets | For alphabets True positive |
|---|---|---|---|---|---|---|---|
| 1 | Head is not resting at particular position. Camera - Logitech | ANAGHAP | 5 | 50 | om nama shivaya | 13 | 12 |
| 2 | Head is not resting at particular position. Camera - Logitech | ANAGHAP | 5 | 50 | How are you | 9 | 9 |
| 3 | Head is not resting at particular position. Camera - Logitech | ANAGHAP | 5 | 50 | What you want | 11 | 10 |
| 4 | Head is not resting at particular position. Camera - Logitech | ANAGHAP | 5 | 50 | Please give me water | 17 | 14 |
| 5 | Head is not resting at particular position. Camera - Logitech | ANAGHAP | 5 | 50 | I want to go to washroom | 19 | 17 |

| Sl. No | For alphabets | | | Recall | Preci-sion | Accuracy % | Remark | Inference |
|---|---|---|---|---|---|---|---|---|
| | True negative | False Positive | False Negative | | | | | |
| 1 | 1 | 0 | 0 | 92.3 | 92.3 | 100 | 13 words (Alphabets y is true negative) | |
| 2 | 0 | 0 | 0 | 100 | 100 | 100 | 9 words | |
| 3 | 0 | 1 | 0 | 100 | 100 | 90.91 | 10 words (Alphabets y is true negative) | |
| 4 | 3 | 0 | 0 | 82.4 | 82.4 | 100 | 17 words (Alphabets v, r, m is true negative) | |
| 5 | 2 | 0 | 0 | 89.5 | 89.5 | 100 | 19 words (Alphabets o, w is true negative) | |

Conclusion:

In the SENTENCE DETECTION TEST, sentences are formed using eye sign language, first with the use of alphabets and later with the use of words. Here, FIVE distinct sentences were chosen, and with one subject and the camera kept at a distance of 50 cm, an accuracy of around 90% was obtained for each sentence formation. The majority of the time 100% accuracy was obtained.

We claim:

1. An Eye Sign language communication system (101), said system comprising:

I/O module comprising of a touch display (102), a camera (103), a speaker (104);

Language Module (LM) comprising of pre-defined eye movements and the corresponding alphabets and numbers provided to the User (U)

server (105);

Power source (106);

wherein said User (U) is positioned before the camera in a manner that face data is captured and landmark points in the face including eyes is detected;

Machine Learning and Deep Learning algorithms are used for identifying the Region of Interest (ROI);

the pre-defined eye movements of alphabets and numbers of said language module can be captured by said camera (103);

on receiving CONFIRM signal from said User (U), said system provides voice output, and on receiving RESUME and CONFIRM signal from said USER (U), said system starts a new iteration of capturing eye-movements and providing voice output.

2. The Eye Sign language communication system (101) as claimed in claim 1, wherein said system is an Interactive communication system.

3. The Eye Sign language communication system (101) as claimed in claim 1, wherein said pre-defined eye-movements are the collection of pre-defined eye blinks and direction of eye gaze corresponding to pre-defined alphabets, numbers and words/phrases.

4. The Eye Sign language communication system (101) as claimed in claim 1, wherein said pre-defined eye movements can be put together to form original sentence.

5. A method for Eye Sign language communication system (101), said method comprising the steps of:

preparing a language module comprising of pre-defined eye movements and the corresponding to alphabets and numbers;

deploying at least one camera (103*a*, 103*b*, 103*c* . . . 103*n*) in front of User (U);

Identifying the Region of Interest (ROI) including eyes movements of the User (U) by Machine Learning and Deep Learning providing said User (U) with said language module comprising of pre-defined eye movements and the corresponding to alphabets and numbers;

Inputting "CONFIRM" by the User (U) through said predefined eye-movements to enable system to process the eye-movements and the corresponding alphabets and numbers to provide voice output; and Inputting "RESUME" signal followed by "CONFIRM" signal from said USER (U) to enable said system to start a new iteration of capturing eye-movements and providing voice output.

* * * * *